(12) United States Patent
Yoshikawa

(10) Patent No.: US 11,310,193 B2
(45) Date of Patent: Apr. 19, 2022

(54) INFORMATION PROCESSING APPARATUS AND NON-TRANSITORY COMPUTER READABLE MEDIUM

(71) Applicant: FUJIFILM BUSINESS INNOVATION CORP., Tokyo (JP)

(72) Inventor: Satoshi Yoshikawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/749,026

(22) Filed: Jan. 22, 2020

(65) Prior Publication Data
US 2021/0099416 A1 Apr. 1, 2021

(30) Foreign Application Priority Data
Sep. 30, 2019 (JP) .............................. JP2019-179560

(51) Int. Cl.
*H04L 29/12* (2006.01)
*H04L 12/58* (2006.01)
*H04L 61/4594* (2022.01)
*H04L 51/224* (2022.01)
*H04L 51/48* (2022.01)

(52) U.S. Cl.
CPC .......... *H04L 61/1594* (2013.01); *H04L 51/24* (2013.01); *H04L 51/28* (2013.01)

(58) Field of Classification Search
CPC ..... H04L 61/1594; H04L 51/28; H04L 51/24; H04N 1/32096; H04N 2201/0094
See application file for complete search history.

(56) References Cited

U.S. PATENT DOCUMENTS

| | | | |
|---|---|---|---|
| 9,350,789 B2 * | 5/2016 | Matoba | G06F 3/12 |
| 2011/0026075 A1 * | 2/2011 | Maruyama | H04N 1/32058 358/1.15 |
| 2011/0205578 A1 * | 8/2011 | Gouda | G06F 3/1222 358/1.15 |
| 2012/0147436 A1 * | 6/2012 | Nishiyama | H04N 1/32096 358/406 |
| 2014/0082137 A1 * | 3/2014 | Matoba | H04L 67/02 709/217 |
| 2014/0185078 A1 * | 7/2014 | Cudak | G06F 3/126 358/1.14 |

FOREIGN PATENT DOCUMENTS

| | | |
|---|---|---|
| JP | 2012-129727 A | 7/2012 |
| JP | 2014-060475 A | 4/2014 |

\* cited by examiner

*Primary Examiner* — Joe Chacko
(74) *Attorney, Agent, or Firm* — Oliff PLC

(57) ABSTRACT

An information processing apparatus includes: a notification unit that performs notification to a first person when the first person differs from a second person and refrains from performing the notification when the first person is the same as the second person, wherein the first person is one who instructs execution of an application for transmitting data to a preset transmission destination, the second person is one who has changed information on the transmission destination included in an address book, and the notification indicates that the information on the transmission destination has been changed.

10 Claims, 15 Drawing Sheets

FIG. 2

| ROUTINE OPERATION APPLICATION | USER ID | TRANSMISSION DESTINATION ADDRESS | TRANSMISSION DESTINATION ID | OTHER JOB PARAMETERS |
|---|---|---|---|---|
| APPLICATION A | 1 | User01@yyy.yyy | 0001 | ... |
| APPLICATION B | 2 | 111-111-1111 | 0002 | ... |
| APPLICATION C | ALL | ftp://yyy.yyy.yyy.yyy | 0003 | ... |
| ... | — | — | — | — |

31

| DESTINATION NAME | TRANSMISSION DESTINATION TYPE | TRANSMISSION DESTINATION ID | TRANSMISSION DESTINATION ADDRESS | CHANGE HISTORY (CHANGED USER) |
|---|---|---|---|---|
| DESTINATION A | Email | 0001 | User01@xxx.xxx | 1 |
|  | Fax | 0002 | 111-111-111 |  |
|  | FTP | 0003 | ftp://xxx.xxx.xxx.xxx | 3 |
| DESTINATION B | Email | 0004 | User02@xxx.xxx |  |
|  | SMB | 0005 | ¥¥User02¥Share | 1 |
| DESTINATION C | Fax | 0006 | 333-333-333 | GUEST |
| ... | — | — | — |  |

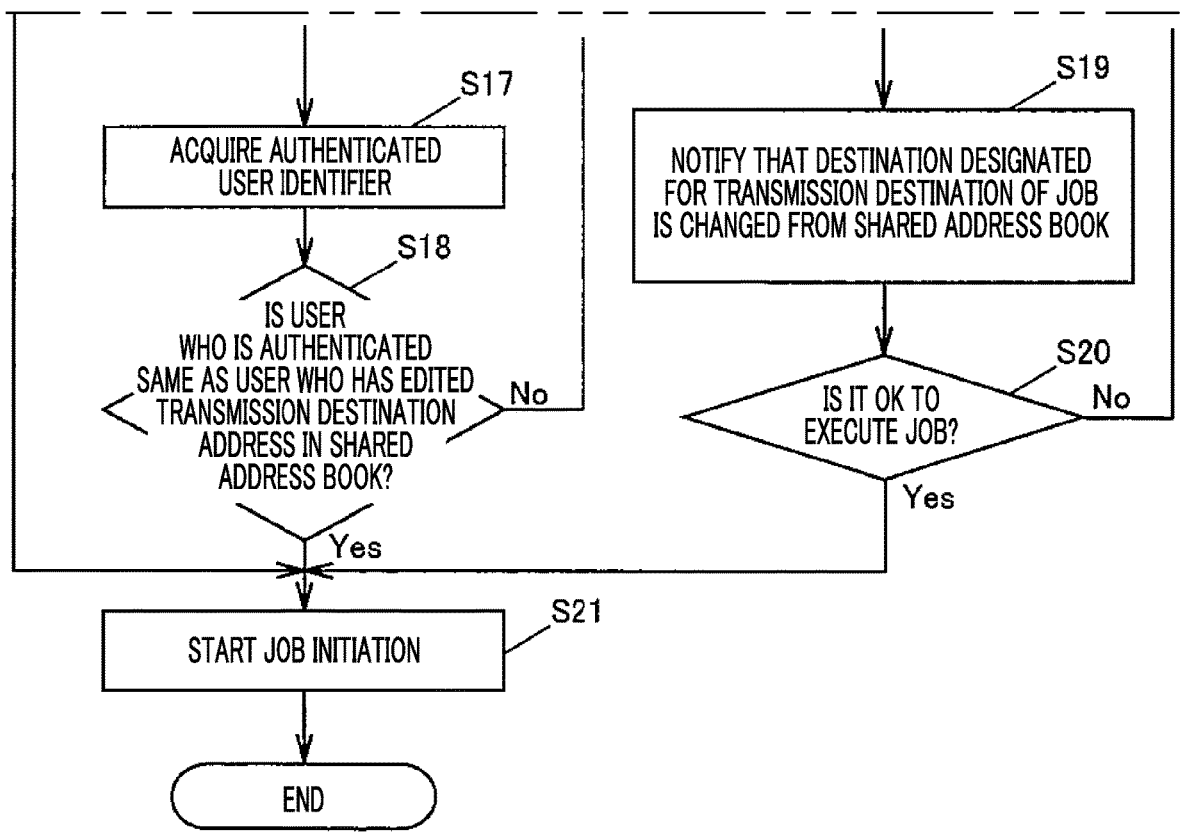

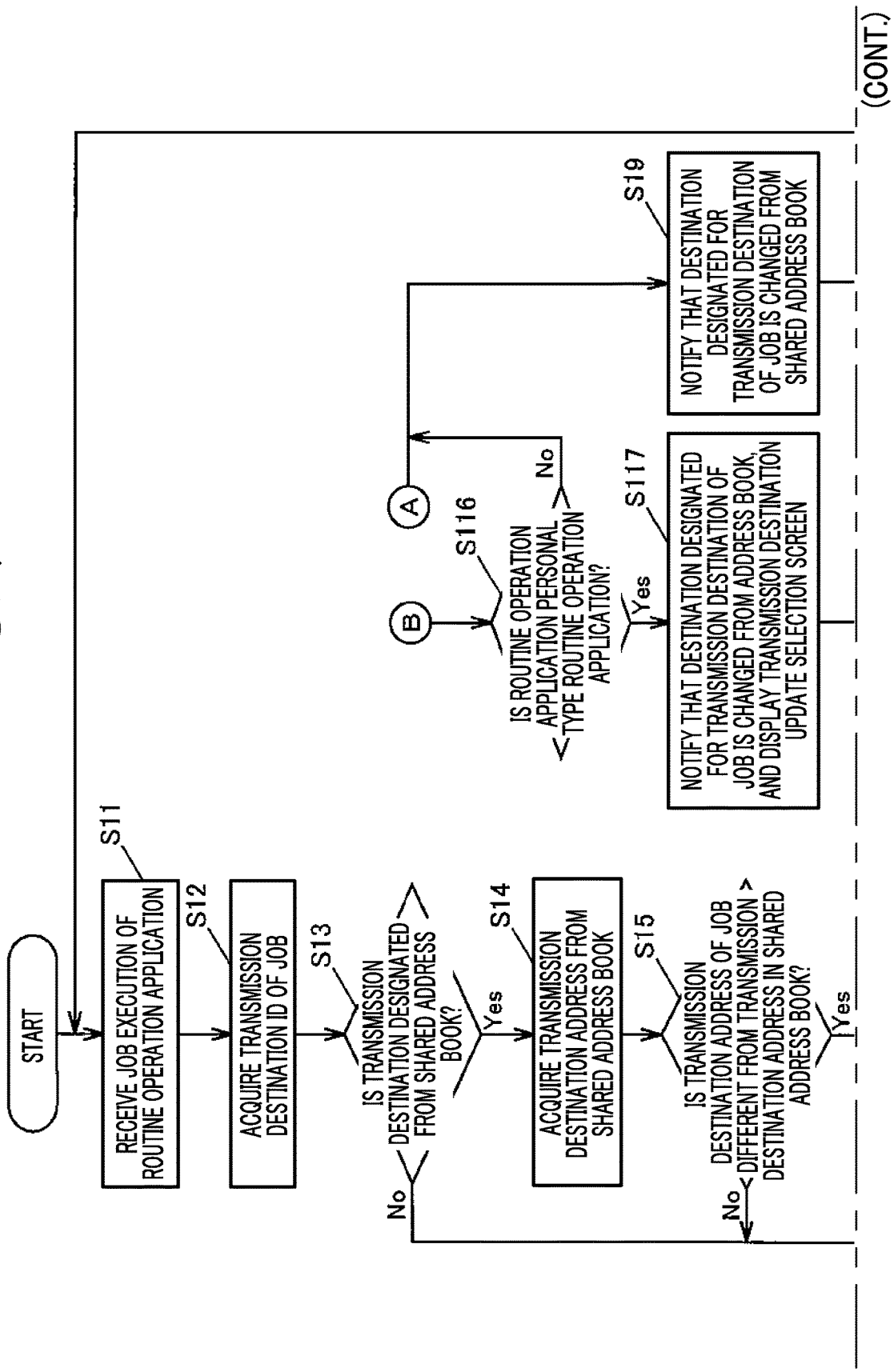

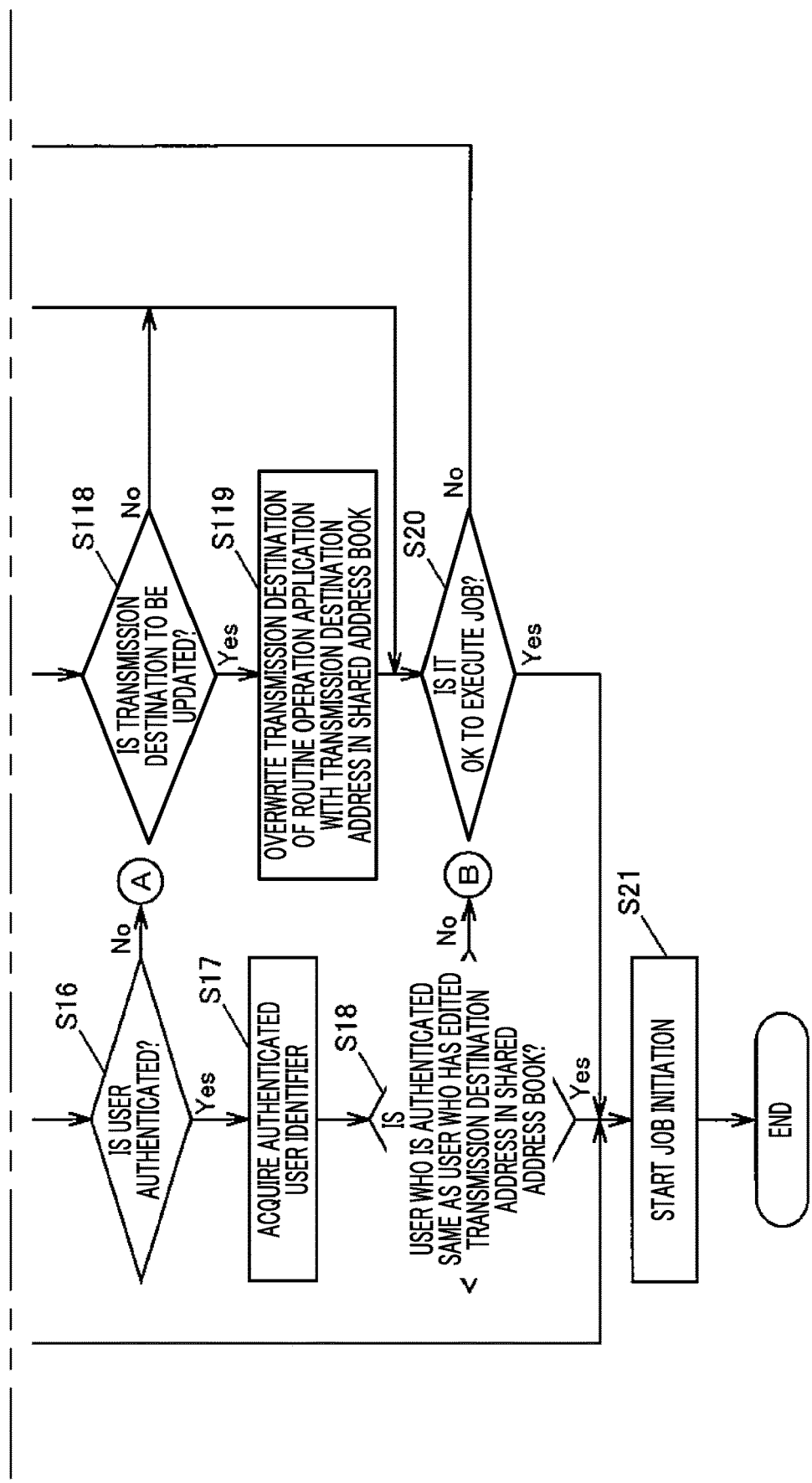

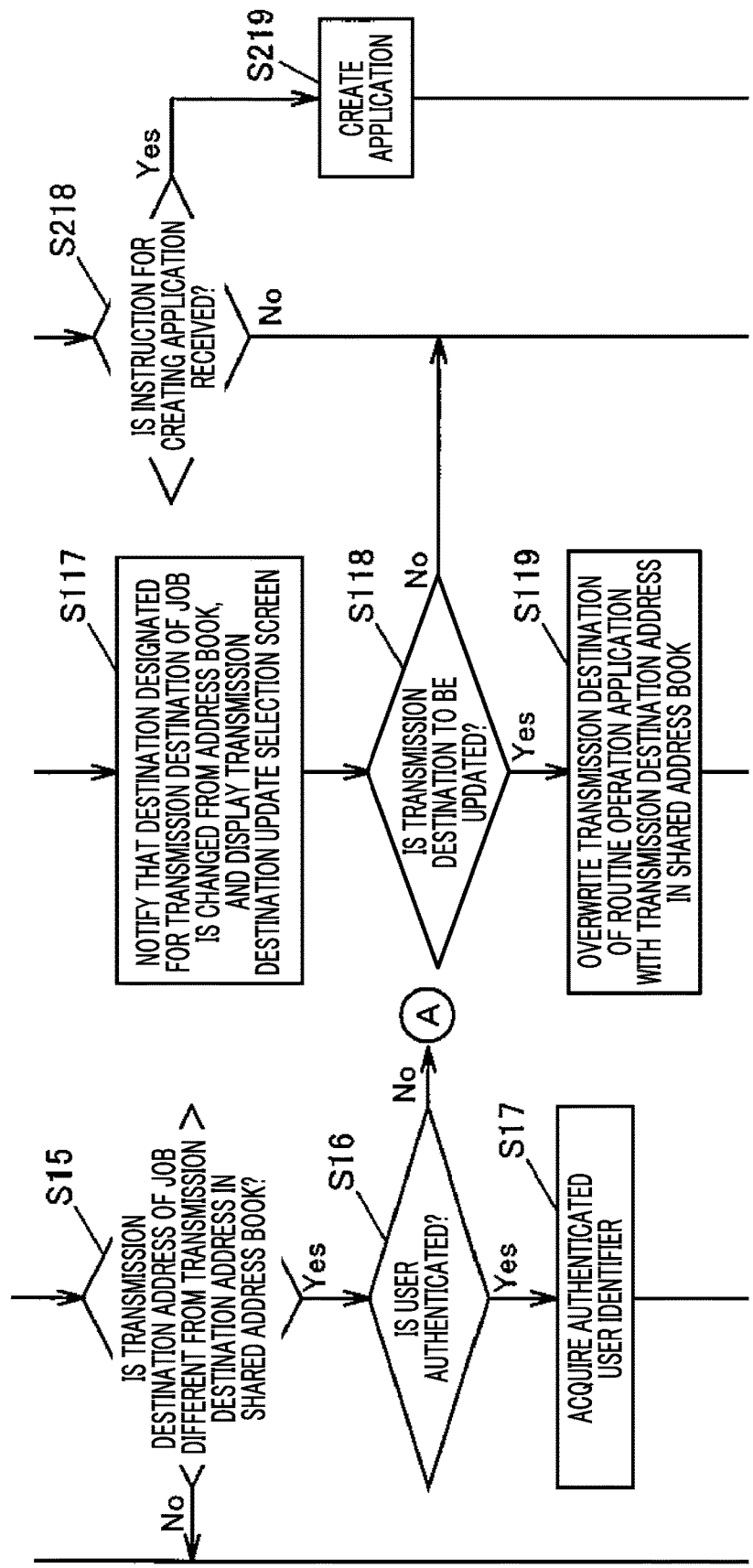

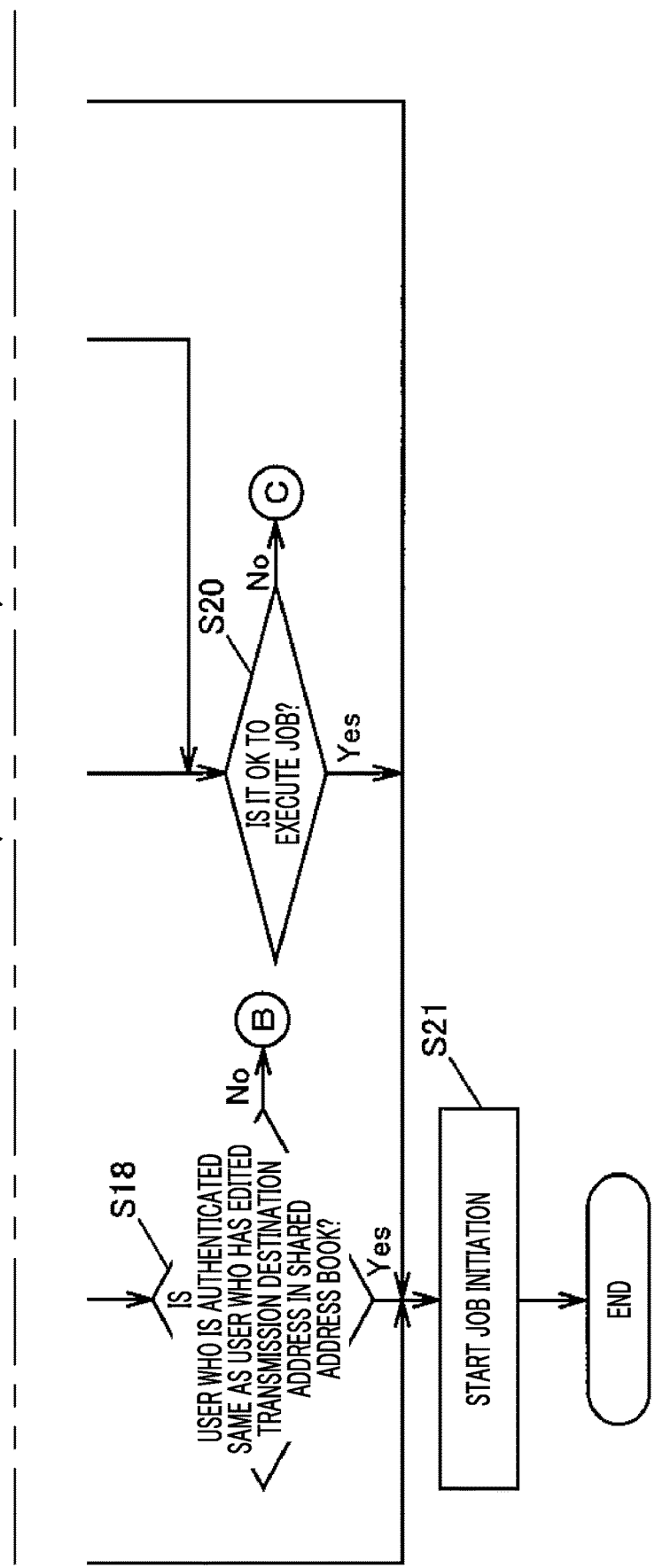

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-179560 filed Sep. 30, 2019.

BACKGROUND

(i) Technical Field

The present disclosure relates to an information processing apparatus and a non-transitory computer readable medium.

(ii) Related Art

In recent years, there has been proposed an image processing apparatus that can prevent erroneous transmission due to changing of destination information in a shared address book (for example, refer to JP-A-2012-129727).

An image processing apparatus described in JP-A-2012-129727 includes a communication unit that transmits and receives image data; an acquisition unit that acquires destination information including at least an identifier and a transmission destination; a saving unit that saves the destination information for the image data transmitted by the communication unit; a determination unit that determines whether or not the acquired destination information is changed by comparing the destination information designated by a designation unit with the destination information saved by the saving unit; and a display that displays a confirmation screen of the destination information when the determination unit determines that the destination information is changed.

When a user who has changed the information on the transmission destination of the address book is a user who instructs execution of an application, the user recognizes that the information on the transmission destination has been changed.

SUMMARY

Aspects of non-limiting embodiments of the present disclosure relate to providing an information processing apparatus and a non-transitory computer readable medium, which can refrain from performing notification of changing information on a transmission destination in an address book when a user who has changed information on a transmission destination in an address book is a user who instructs execution of an application.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing apparatus including: a notification unit that performs notification to a first person when the first person differs from a second person and refrains from performing the notification when the first person is the same as the second person, wherein the first person is one who instructs execution of an application for transmitting data to a preset transmission destination, the second person is one who has changed information on the transmission destination included in an address book, and the notification indicates that the information on the transmission destination has been changed.

BRIEF DESCRIPTION OF THE DRAWINGS

Exemplary embodiments of the invention will be described in detail based on the following figures, wherein:

FIG. 2 is a view illustrating an example of a routine operation application table;

FIG. 9 is a flowchart illustrating an example of an operation of an image forming apparatus according to a second exemplary embodiment of the present disclosure;

DETAILED DESCRIPTION

Figure 1:
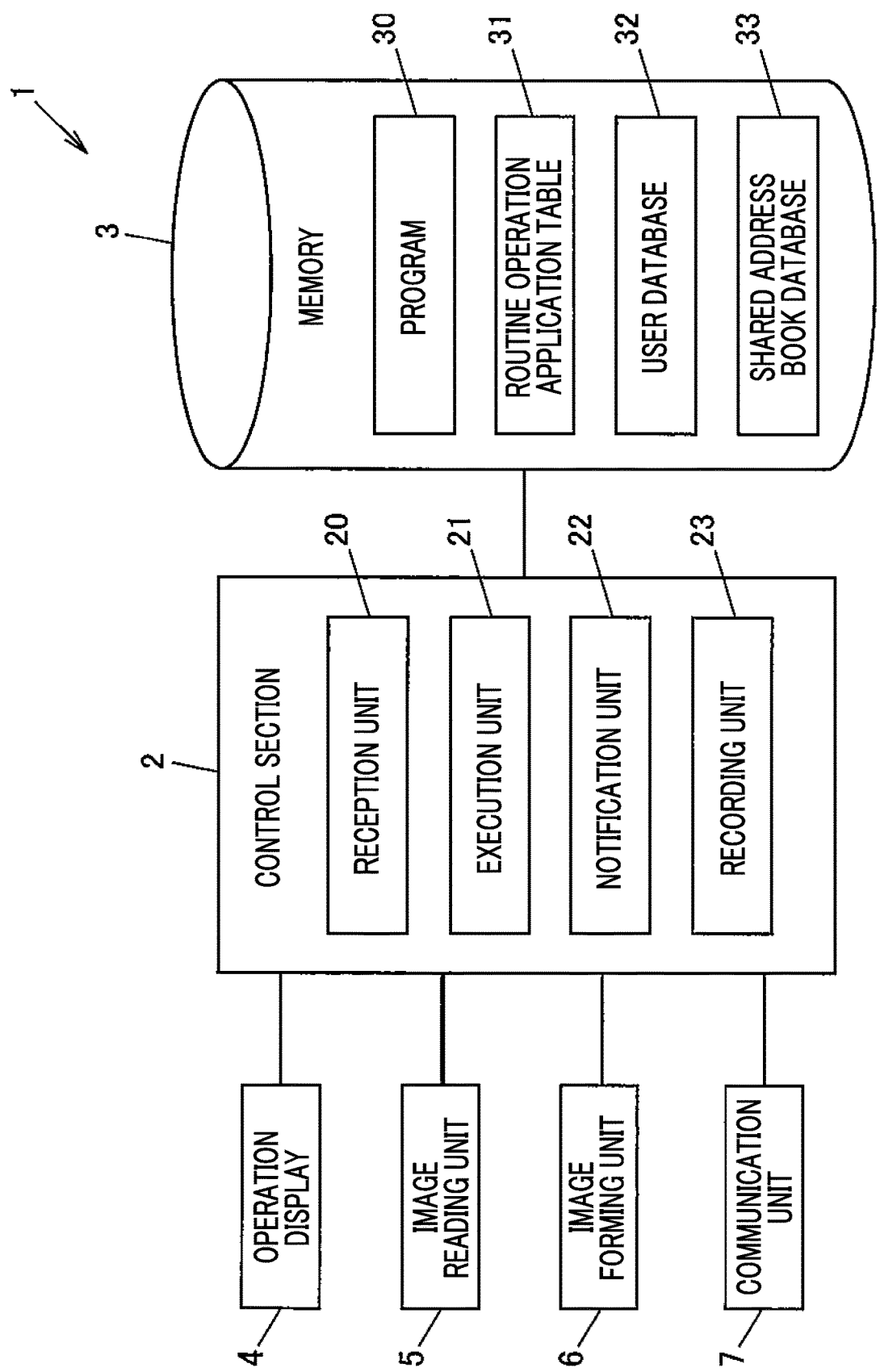
FIG. 1 is a block diagram illustrating a configuration example of an image forming apparatus according to a first exemplary embodiment of the present disclosure.

Hereinafter, exemplary embodiments of the present disclosure will be described with reference to the drawings. In addition, in each figure, the configuration elements having the substantially same function will be given the same reference numerals, and the overlapped description thereof will be omitted. In addition, as an example of an information processing apparatus, an image forming apparatus will be described below.

Outline of Exemplary Embodiments

The image forming apparatus according to the exemplary embodiment includes: a notification unit that performs notification indicating that information on a transmission destination is changed with respect to a first person who instructs execution of an application for transmitting data to information on a preset transmission destination when the first person is different from a second person who has changed the information on the transmission destination included in an address book, and does not perform the notification when the first person is the same as the second person.

"Information on preset transmission destination" refers to information on a transmission destination associated with an application by setting.

First Exemplary Embodiment

FIG. 1 is a block diagram illustrating a configuration example of the image forming apparatus according to a first exemplary embodiment of the present disclosure. An image forming apparatus 1 is a multifunction machine having plural functions, such as a scanning function, a printing function, a copying function, an e-mail function, and a facsimile function. In addition, the image forming apparatus 1 may be an image forming apparatus having a single function, such as a printing function or a facsimile function.

A communication unit 7 that connects a control section 2 that controls each unit of the image forming apparatus 1, a memory 3 that stores a program 30 or various pieces of data, an operation display 4, an image reading unit 5, an image forming unit 6, and an external network to each other, is provided.

The control section 2 is realized by a processor, such as a central processing unit (CPU), or an interface. The processor functions as a reception unit 20, an execution unit 21, a notification unit 22, and a recording unit 23 and the like by executing the program 30. Each of the units 20 to 23 will be described later.

The memory 3 includes a read only memory (ROM), a random access memory (RAM), a hard disk, and the like, and stores various pieces of information, such as a program 30, a routine operation application table 31 (refer to FIG. 2), a user database 32 (refer to FIG. 3), a shared address book database 33 (refer to FIG. 4) and the like.

In the user database 32, information on the attribute of a user is recorded. The shared address book is an address book shared and used by plural users. In the shared address book database 33 according to the exemplary embodiment, a transmission destination address, such as an e-mail address or a fax number, is shared and used by the plural users. Among the users, there are users registered in the user database 32 and users not registered in the user database 32. In the specification, there is a case where the registration means recording.

The operation display 4 has, for example, a configuration in which a touch panel is superimposed on a display, such as a liquid crystal display, displays various screens on a display screen, and receives operations from the user on the touch panel.

The image reading unit 5 includes, for example, a scanner and an auto document feeder, and reads an image from an original document disposed on a document stable or an original document fed from the auto document feeder.

The image forming unit 6 forms and outputs an image onto a recording medium, such as a paper sheet, by using, for example, an electrophotographic system or an ink jet system.

The communication unit 7 controls the network and receives a job transmitted from a user terminal (not illustrated) via an external network.

FIG. 2 is a view illustrating an example of the routine operation application table 31. The routine operation application table has items, such as "routine operation application", "user ID", "transmission destination address", "transmission destination ID", and "other job parameters". The name (also referred to as the application name) of the routine operation application is recorded in the item "routine operation application". In "transmission destination ID", a transmission destination ID for identifying the transmission destination is recorded. In "user ID", a user ID for identifying a user who instructs execution of the routine operation application is recorded. The transmission destination address is an example of information or a destination name of the transmission destination. The user who instructs execution of the routine operation application is an example of the first person.

The routine operation application is an application in which parameters are set in advance. In the exemplary embodiment, the routine operation application is an application that transmits a document file read by the image reading unit 5 to the transmission destination address preset as a parameter. A document file is an example of data to be transmitted.

The routine operation application includes a personal type application and other applications (hereinafter, also referred to as a shared type application). The personal type application is an application in which a specific user himself or herself has set a transmission destination address and other parameters in advance for use. The shared type application is an application in which the transmission destination address or other parameters are set in advance not only by a specific user, but also for general users.

In item "transmission destination address", an address of the transmission destination to which the job execution result is transmitted is recorded. The output destination to which the job execution result is output is an example of the information on the preset transmission destination. Examples of the transmission destination address include the following depending on the transmission destination type, such as the transmission destination and the communication unit.

(a) Transmission Destination

Examples of the transmission destination include a file transfer protocol (FTP) server, a server message block (SMB) server and the like, and examples of the transmission destination address include an IP address and a folder destination.

(b) Communication Unit

Examples of the communication unit include e-mail and facsimile, and examples of the transmission destination address include an e-mail address, a fax number and the like.

Figure 3:
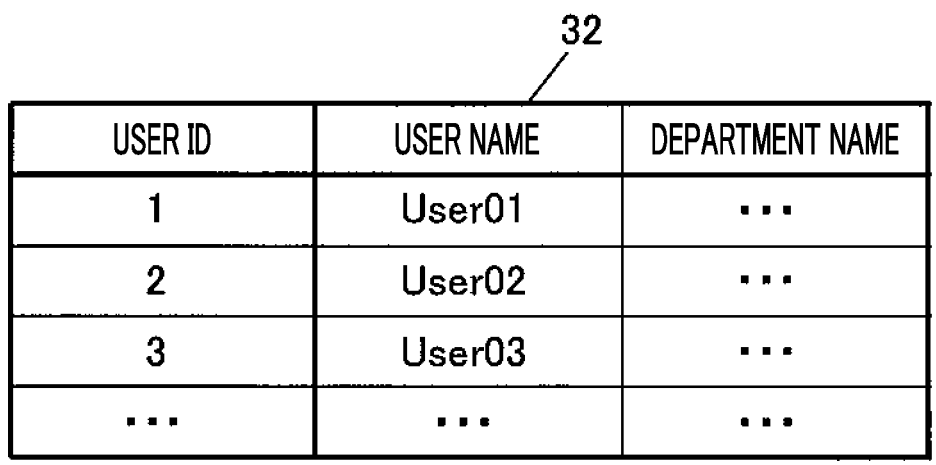
FIG. 3 is a view illustrating an example of a user database.

FIG. 3 is a view illustrating an example of the user database 32. The user database 32 includes items, such as "user ID", "user name", and "department name" indicating the department to which the user belongs.

Figure 4:
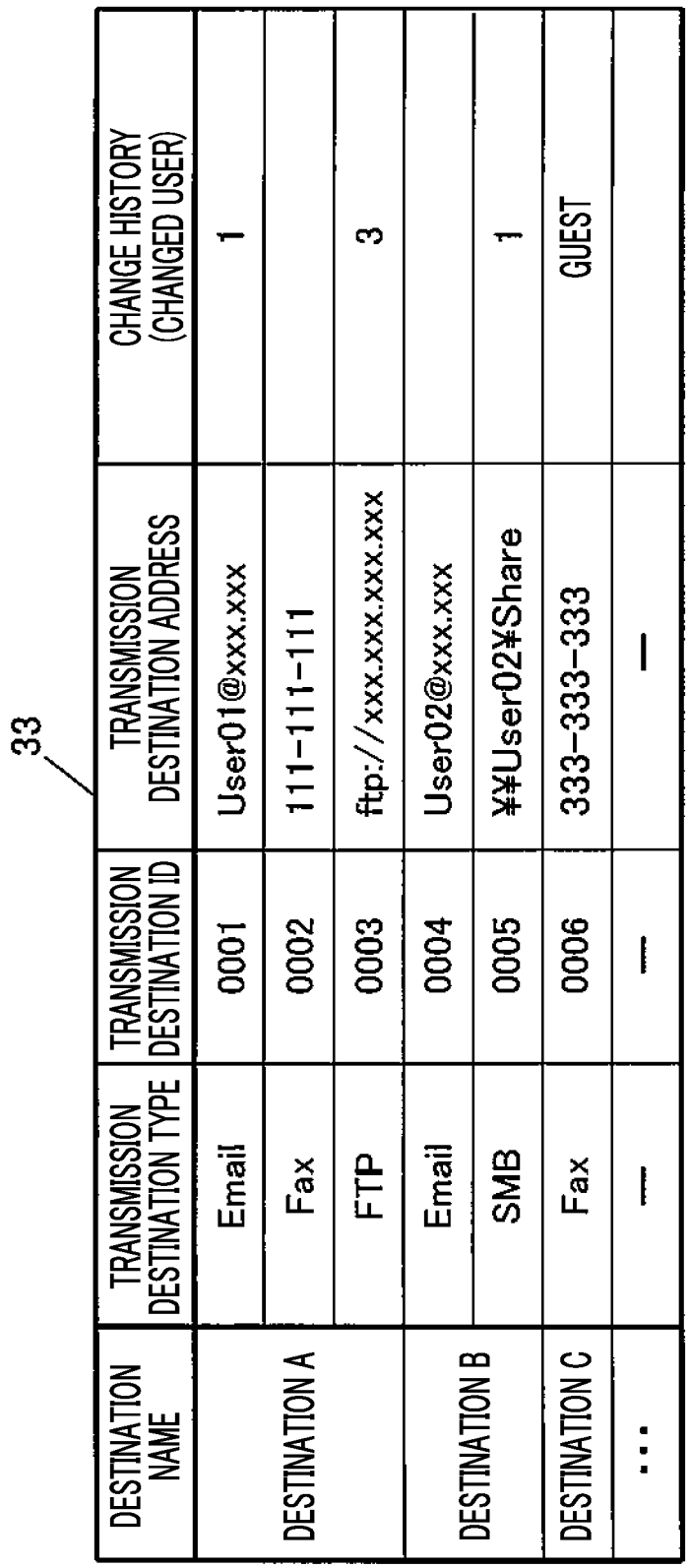
FIG. 4 is a view illustrating an example of a shared address book database.

FIG. 4 is a view illustrating an example of the shared address book database 33. The shared address book database 33 includes items, such as "destination name", "transmission destination type", "transmission destination ID", "transmission destination address", "change history" that corresponds thereto, and the like. "Transmission destination type" is a type for identifying the transmission destination, and includes, for example, e-mail, fax, FTP, SMB and the like. In "change history", the user ID of the user who has performed the operation for changing the transmission destination address is recorded. The user who has performed the operation for changing the transmission destination address is an example of the second person who has changed the information on the transmission destination.

As illustrated in destination A or destination B in FIG. 4, plural transmission destination types, transmission destination IDs, transmission destination addresses, and change histories may be associated with one destination name. When the user ID of the operator who has changed the transmission destination address is not recorded in the user database 32, "guest" is recorded in "change history".

Next, each of the units 20 to 23 of the control section 2 will be described.

The reception unit 20 receives an operation on the screen displayed on the operation display 4, a user ID, a job execution instruction and the like.

The execution unit 21 executes the routine operation application job, and for example, transmits the document file read by the image reading unit 5 to the transmission destination address that corresponds to an application name of the routine operation application, with reference to the routine operation application table 31. Further, when an operation of an "execute" button 101 is selected on a transmission destination update selection screen 110 as an example of a predetermined operation, the execution unit 21 changes the transmission destination address to that in the shared address book database 33 and executes the job.

When the user who instructs the execution of the routine operation application for transmitting data to a preset transmission destination address is different from the user who has changed the transmission destination address included in the shared address book database 33, the notification unit 22 performs notification indicating that the transmission destination address is changed with respect to the user who instructs the execution of the routine operation application, and when the user who instructs the execution of the routine operation application is the same as the user who has changed the transmission destination address, the notification unit 22 does not perform the notification.

By comparing the user who instructs the execution of the routine operation application input before the instruction of the execution of the routine operation application with the user who has changed the transmission destination address recorded in the shared address book database 33, the notification unit 22 determines whether or not the user who instructs the execution of the routine operation application is the same as the user who has changed the transmission destination address recorded in the shared address book database 33.

When the transmission destination address included in the shared address book database 33 is changed, the recording unit 23 records the user who has changed the transmission destination address corresponding to the transmission destination address, in the shared address book database 33.

Operation in Exemplary Embodiment

Next, an example of the operation of the image forming apparatus 1 will be described with reference to FIGS. 5 to 11.

(1) Edit Destination

Figure 6:
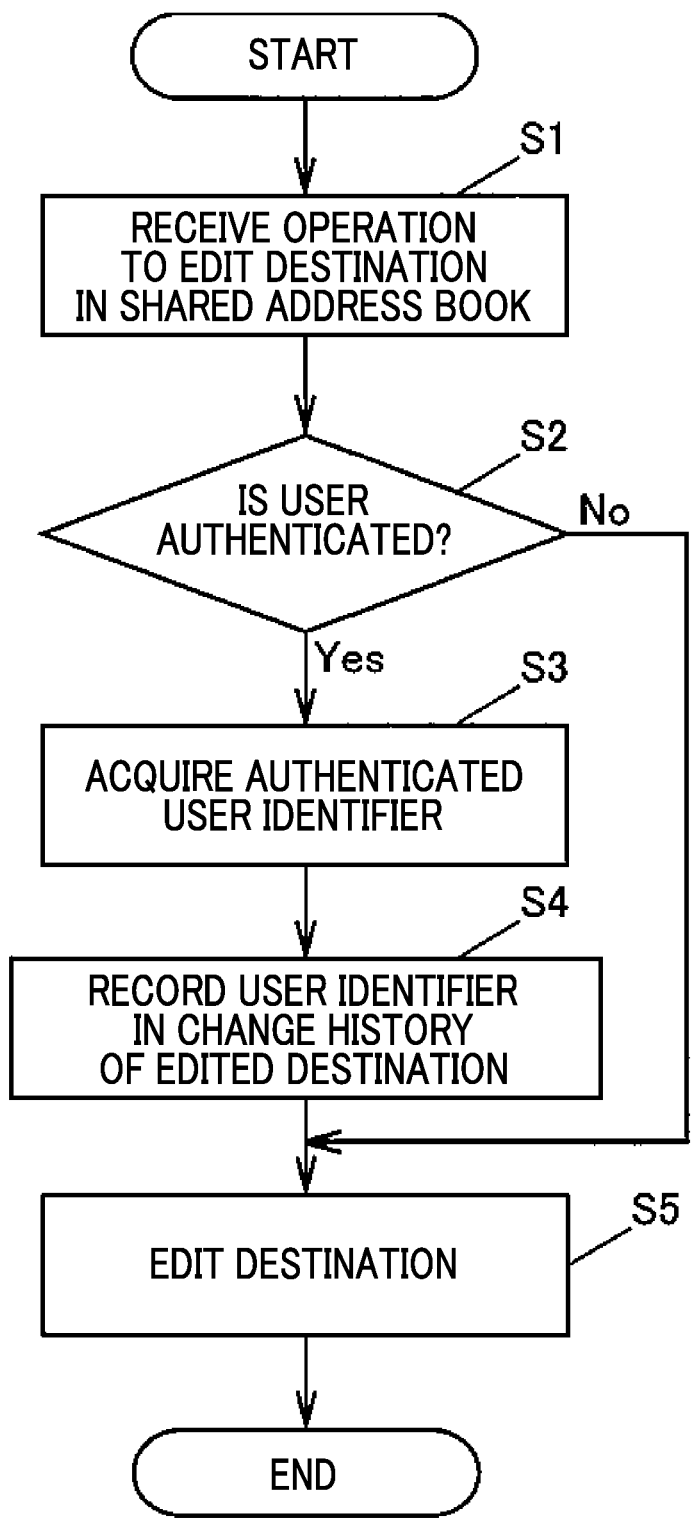
FIG. 6 is a flowchart illustrating an example of destination editing processing of the image forming apparatus according to the exemplary embodiment.

An example of the operation of the image forming apparatus 1 when performing destination editing processing will be described with reference to FIG. 6. FIG. 6 is a flowchart illustrating an example of the destination editing processing of the image forming apparatus 1 according to the exemplary embodiment.

The reception unit 20 receives an instruction to edit the transmission destination address in the shared address book database 33 from the operation display 4 together with the user ID (S1). In addition, the reception unit 20 may receive the instruction to edit the transmission destination address from a user terminal via the communication unit 7.

The notification unit 22 determines whether or not the user who has instructed the editing of the transmission destination address is an authenticated user (S2). Here, the authenticated user refers to a user who has been authenticated by authentication processing at the time of login, and specifically refers to a user whose input user ID is registered in the user database 32.

When the user is not an authenticated user (S2: No), that is, when the user ID is not registered in the user database 32, the recording unit 23 records "guest" indicating that the user is not an authenticated user in a change history field of the shared address book database 33, edits the transmission destination address in the shared address book database 33 based on the instruction of the user, and ends the processing (S5).

When the user who has performed the editing instruction is an authenticated user (S2: Yes), that is, when the user ID is registered in the user database 32, the notification unit 22 acquires the user ID (hereinafter, referred to as an authenticated user identifier) from the user database 32 (S3), the recording unit 23 records the user ID as the authenticated user identifier in the change history field of the shared address book database 33 (S4), and the processing ends by editing the transmission destination address in the shared address book database 33 based on the instruction of the user (S5).

(2) Execution of Routine Operation Application Job

Figure 7:
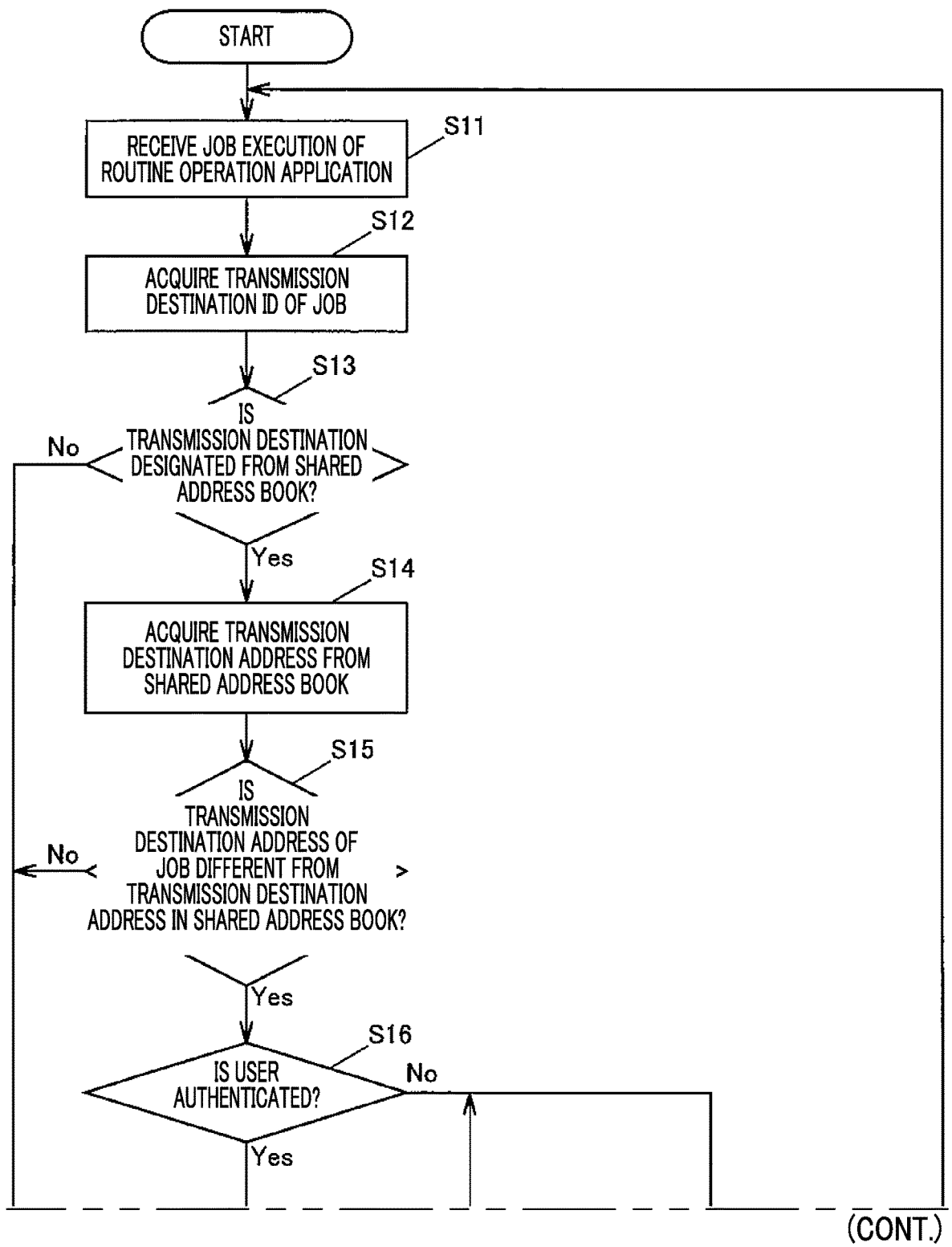
FIG. 7 is a flowchart illustrating an example of an operation of the image forming apparatus according to the exemplary embodiment.

An example of the operation of the image forming apparatus 1 when executing the routine operation application job will be described with reference to FIG. 7. FIG. 7 is a flowchart illustrating an example of the operation of the image forming apparatus 1 according to the exemplary embodiment.

The reception unit 20 receives an instruction to execute the routine operation application job together with the user ID from the operation display 4 (S11). In addition, the reception unit 20 may receive the instruction to execute the job from the user terminal via the communication unit 7.

Based on the received instruction to execute the job, the notification unit 22 acquires the transmission destination ID that corresponds to the routine operation application that has received the execution instruction from the routine operation application table 31 (S12). The notification unit 22 determines whether or not the transmission destination address of the routine operation application is designated from the shared address book, that is, whether or not the transmission destination ID which is the same as the transmission destination ID of the routine operation application is recorded in the shared address book database 33 (S13).

When the transmission destination ID which is the same as the transmission destination ID of the routine operation application is recorded in the shared address book database 33 (S13: Yes), the notification unit 22 acquires the transmission destination address that corresponds to the transmission destination ID which is the same as the transmission destination ID of the routine operation application from the shared address book database 33 (S14). The notification unit 22 determines whether or not the transmission destination address in the routine operation application table 31 matches the transmission destination address in the shared address book database 33 (S15).

When the transmission destination address of the routine operation application table 31 does not match the transmission destination address in the shared address book database 33 (S15: Yes), the notification unit 22 determines whether or not the user who has performed the instruction to execute the routine operation application job is an authenticated user (S16).

When the user who has performed the instruction to execute the job is an authenticated user (S16: Yes), the notification unit 22 acquires the authenticated user identifier from the user database 32 (S17), and determines whether or not the authenticated user is the same as the user who has edited the transmission destination address in the shared address book database 33, that is, determines whether or not the acquired authenticated user identifier is recorded in the change history field of the shared address book database 33 (S18).

When the authenticated user identifier is recorded in the shared address book database 33 (S18: Yes), the execution unit 21 executes the routine operation application job with the transmission destination address recorded in the shared address book database 33 as the transmission destination (S21). At this time, the execution unit 21 rewrites the transmission destination address in the routine operation application table 31 in the transmission destination address in the shared address book database 33.

When the transmission destination ID which is the same as the transmission destination ID of the routine operation application is not recorded in the shared address book database 33 in step S13 described above (S13: No), or when the transmission destination addresses match each other in step S15 described above (S15: No), the execution unit 21 executes the routine operation application job with the transmission destination address recorded in the routine operation application table 31 as the transmission destination (S21).

When the user who has performed the instruction to execute the routine operation application job is not an authenticated user in step S16 described above (S16: No), or when the acquired authenticated user identifier is not recorded in the shared address book database 33 in step S18 described above (S18: No), the notification unit 22 displays the transmission destination change notification screen 100 illustrated in FIG. 5 on the operation display 4 (S19). In addition, the notification unit 22 may display the transmission destination change notification screen 100 on the display of the user terminal via the communication unit 7.

Figure 5:
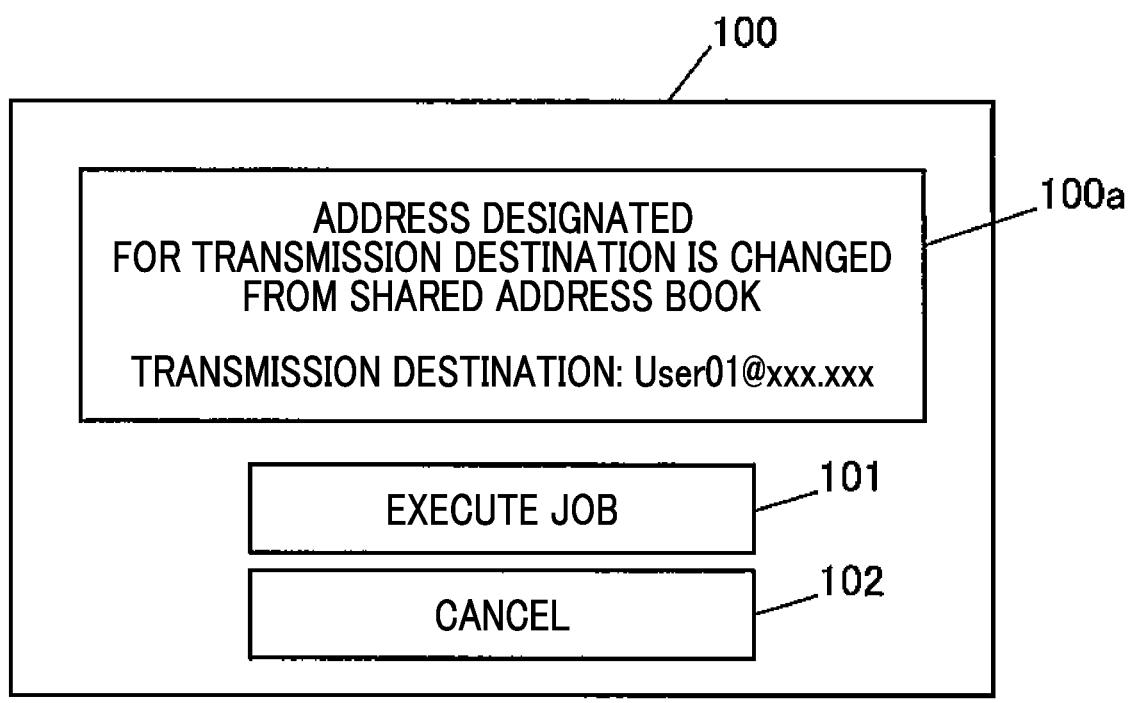
FIG. 5 is a view illustrating an example of a transmission destination change notification screen displayed on an operation display.

FIG. 5 is a view illustrating an example of the transmission destination change notification screen 100 displayed on the operation display 4. The transmission destination change notification screen 100 includes: a message 100a that performs display indicating that the transmission destination address recorded in the shared address book database 33 is changed; an "execute job" button 101 for instructing the execution of the routine operation application job with the transmission destination address recorded in the shared address book database 33 as the transmission destination; and a "cancel" button 102 for canceling the instruction to execute the routine operation application job.

When the reception unit 20 receives the operation of the "execute job" button 101 on the transmission destination change notification screen 100 (S20: Yes), the execution unit 21 executes the routine operation application job with the transmission destination address recorded in the shared address book database 33 as the transmission destination (S21). At this time, the execution unit 21 rewrites the transmission destination address in the routine operation application table 31 in the transmission destination address in the shared address book database 33. The operation of the "execute job" button 101 is an example of the predetermined operation. When the "execute job" button 101 is operated, the notification unit 22 does not notify the message 100a from the second time.

Then, when the reception unit 20 receives an operation of the "cancel" button 102 on the transmission destination change notification screen 100 (S20: No), the execution unit 21 does not execute the routine operation application job.

Second Exemplary Embodiment

In the exemplary embodiment, a function related to a personal type application that can be operated only by an authenticated user is added to the first exemplary embodiment. Hereinafter, the description will focus on differences from the first exemplary embodiment.

After the notification unit 22 performs the notification one time, the execution unit 21 changes the transmission destination address preset for the personal type application to be the same as that in the shared address book database 33 and executes the transmission destination address. Further, the execution unit 21 changes the transmission destination address when an operation of an "execute update" button 111 is selected on the transmission destination update selection screen 110 as an example of the predetermined operation, and executes the transmission destination address.

The notification unit 22 performs the notification with respect to the user who instructs the execution of the routine operation application only one time when the user who instructs the execution of the routine operation application is different from the user who has performed the operation for changing the transmission destination address, and the routine operation application is a personal type application. Further, the notification unit 22 does not perform the notification from the second time when the user who instructs the execution of the routine operation application performs a predetermined operation.

Next, an example of the operation of the image forming apparatus 1 according to a second exemplary embodiment will be described with reference to FIGS. 8 and 9. FIG. 9 is a flowchart illustrating an example of the operation of the image forming apparatus 1 according to the second exemplary embodiment. In FIG. 9, the overlapped description of the steps given the same reference numerals as those of the first exemplary embodiment will be omitted.

When the authenticated user identifier acquired by the reception unit 20 is not recorded in the shared address book database 33 in step S18 (S18: No), the execution unit 21 determines whether or not the routine operation application is a personal type application (S116), that is, determines whether or not the application name of the routine operation application for executing the job is recorded in the routine operation application table 31 in association with the authenticated user identifier.

When the routine operation application is not a personal type application (S116: No), that is, when the routine operation application is a shared type application, more specifically, when "ALL" is recorded in a user ID field of the routine operation application table 31, the process proceeds to step S19 described above.

When the routine operation application is a personal type application (S116: Yes), that is, when the application name of the routine operation application for executing the job is recorded in the routine operation application table 31 in association with the authenticated user identifier, the notification unit 22 displays the transmission destination update selection screen 110 which will be described later is displayed on the operation display 4 (S117).

Figure 8:
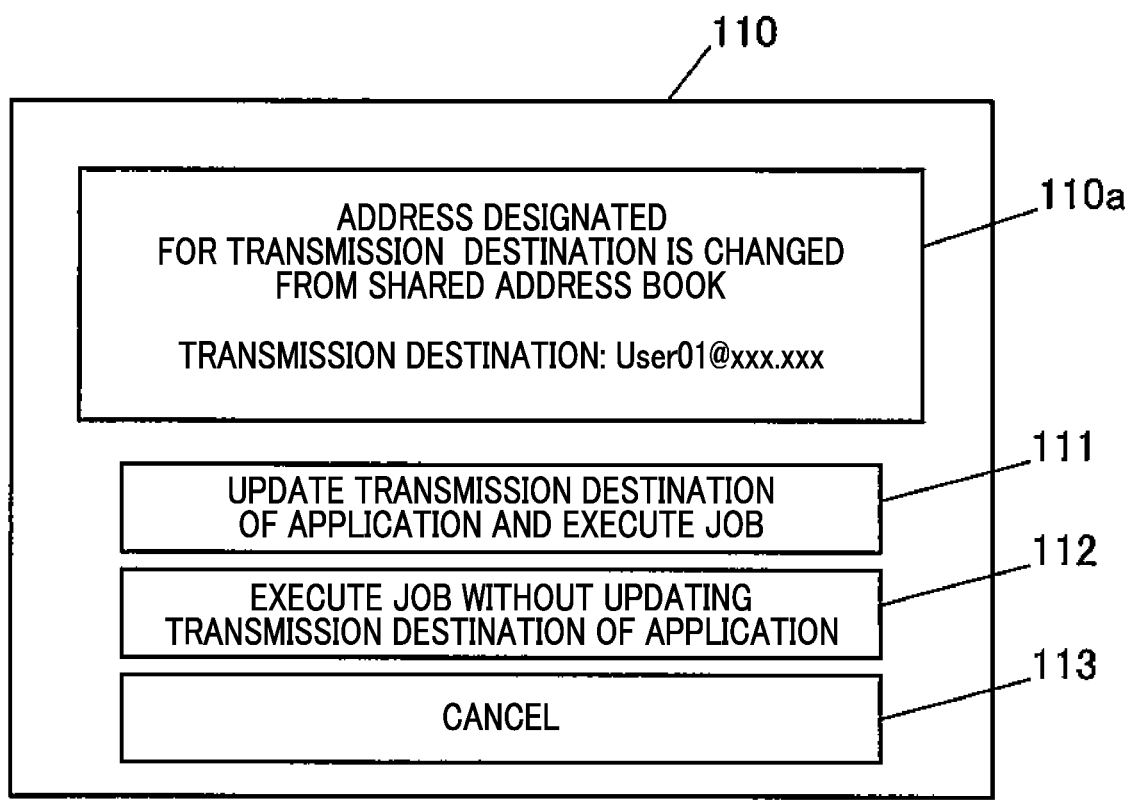
FIG. 8 is a view illustrating an example of a transmission destination update selection screen displayed on the operation display.

FIG. 8 is a view illustrating an example of the transmission destination update selection screen 110 displayed on the operation display 4. The transmission destination update selection screen 110 includes the message 110a for performing display indicating that the transmission destination address of the routine operation application recorded in the shared address book database 33 is changed, the "execute update" button 111, a "not execute update" button 112, and a "cancel" button 113.

The "execute update" button 111 causes the routine operation application job to be executed with the transmission destination address recorded in the shared address book database 33 as a transmission destination, and updates the transmission destination address in the routine operation application table 31 by the transmission destination address in the shared address book database 33. The "not execute update" button 112 causes the routine operation application job to be executed with the transmission destination address recorded in the routine operation application table 31 as a transmission destination, and does not update the transmission destination address in the routine operation application table 31 by the transmission destination address in the shared address book database 33. The "cancel" button 113 is for canceling the instruction of the execution of the routine operation application job.

When it is determined whether or not the "execute update" button 111 of the transmission destination update selection screen 110 displayed on the operation display 4 is operated (S118), and the "execute update" button 111 is operated (S118: Yes), the execution unit 21 updates the transmission destination address recorded in the routine operation application table 31 by the transmission destination address recorded in the shared address book database 33 (S119), the "cancel" button 113 is not operated (S20: Yes), and thus, the execution unit 21 executes the routine operation application job with the transmission destination address recorded in the shared address book database 33 as the transmission destination (S21).

When the "not execute update" button 112 on the transmission destination update selection screen 110 displayed on the operation display 4 is operated (S118: No), and the "cancel" button 113 is not operated (S20: Yes), the execution unit 21 executes the routine operation application job with the transmission destination address recorded in the routine operation application table 31 as the transmission destination (S21).

When the "execute update" button 111 and the "not execute update" button 112 on the transmission destination update selection screen 110 displayed on the operation display 4 are not operated (S118: No), and the "cancel" button 113 is operated (S20: No), the execution unit 21 does not execute the routine operation application job.

Third Exemplary Embodiment

The exemplary embodiment is information, such as a folder destination for creating a new shared type application when the routine operation application is a shared type application, compared to the second exemplary embodiment. The execution unit 21 is added. Hereinafter, the description will focus on differences from the second exemplary embodiment.

After the notification unit 22 performs the notification one time, the execution unit 21 creates and executes a new routine operation application that deals with the changed transmission destination address. Further, the execution unit 21 creates and executes the new routine operation application obtained by changing the transmission destination address when an "execute application creation" button 122 is selected on an application creation selection screen 120 as an example of the predetermined operation.

The execution unit 21 creates a new shared type application when the "create application" button 122 on the application creation selection screen 120 illustrated in FIG. 10 which will be described later is operated, and records user ID, transmission destination address, transmission destination ID, job parameters and the like in the routine operation application table 31. The execution unit 21 executes the job of the created new shared type application. The application creation selection screen 120 is an example of the selection screen.

The notification unit 22 performs the notification with respect to the user who instructs the execution of the routine operation application only one time when the user who instructs the execution of the routine operation application is different from the user who has performed the operation for changing the transmission destination address, and the routine operation application is a shared type application. Further, the notification unit 22 does not perform the notification from the second time when the user who instructs the execution of the routine operation application performs a predetermined operation.

Next, an example of the operation of the image forming apparatus 1 according to a third exemplary embodiment will be described with reference to FIGS. 10 and 11. FIG. 11 is a flowchart illustrating an example of the operation of the image forming apparatus 1 according to the third exemplary embodiment. In FIG. 11, the overlapped description of the steps given the same reference numerals as those of the second exemplary embodiment will be omitted.

When the user who has performed the instruction to execute the routine operation application job is not an authenticated user in step S16 (S16: No), or when the routine operation application is a shared type application (S116: No), the notification unit 22 displays the application creation selection screen 120 which will be described later on the operation display 4 (S217).

Figure 10:
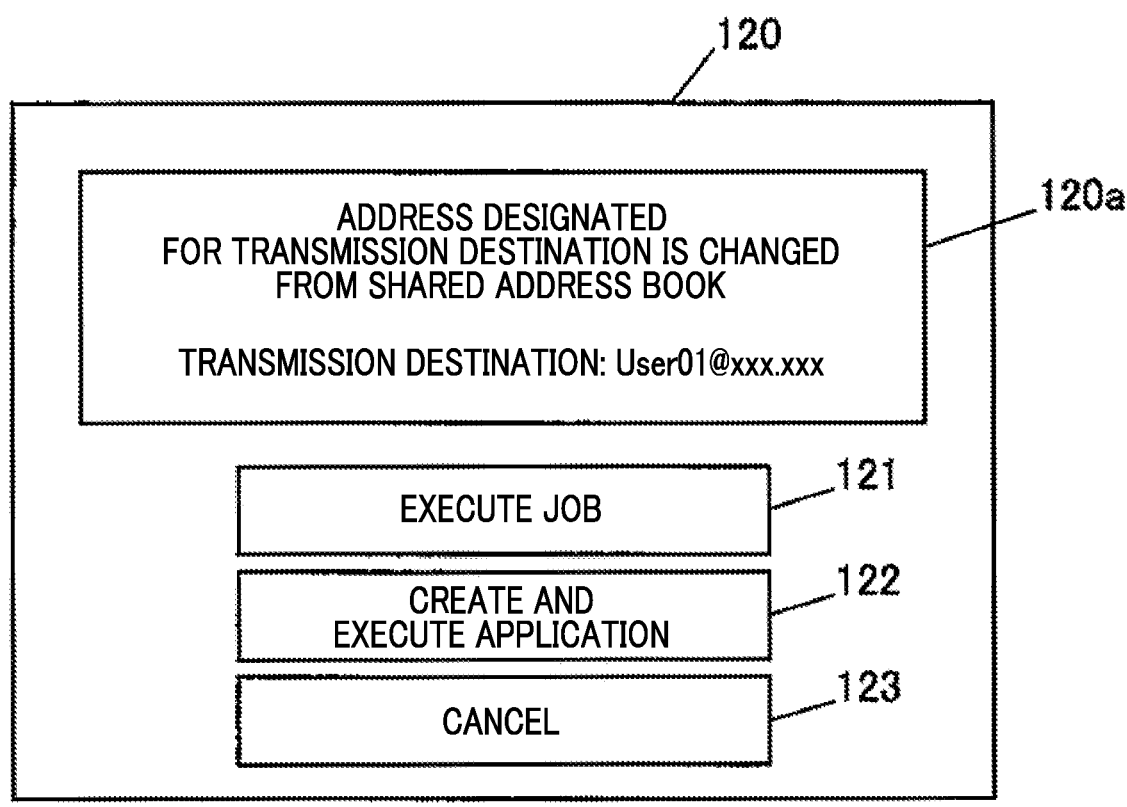
FIG. 10 is a view illustrating an example of an application creation selection screen displayed on the operation display.
Figure 11:
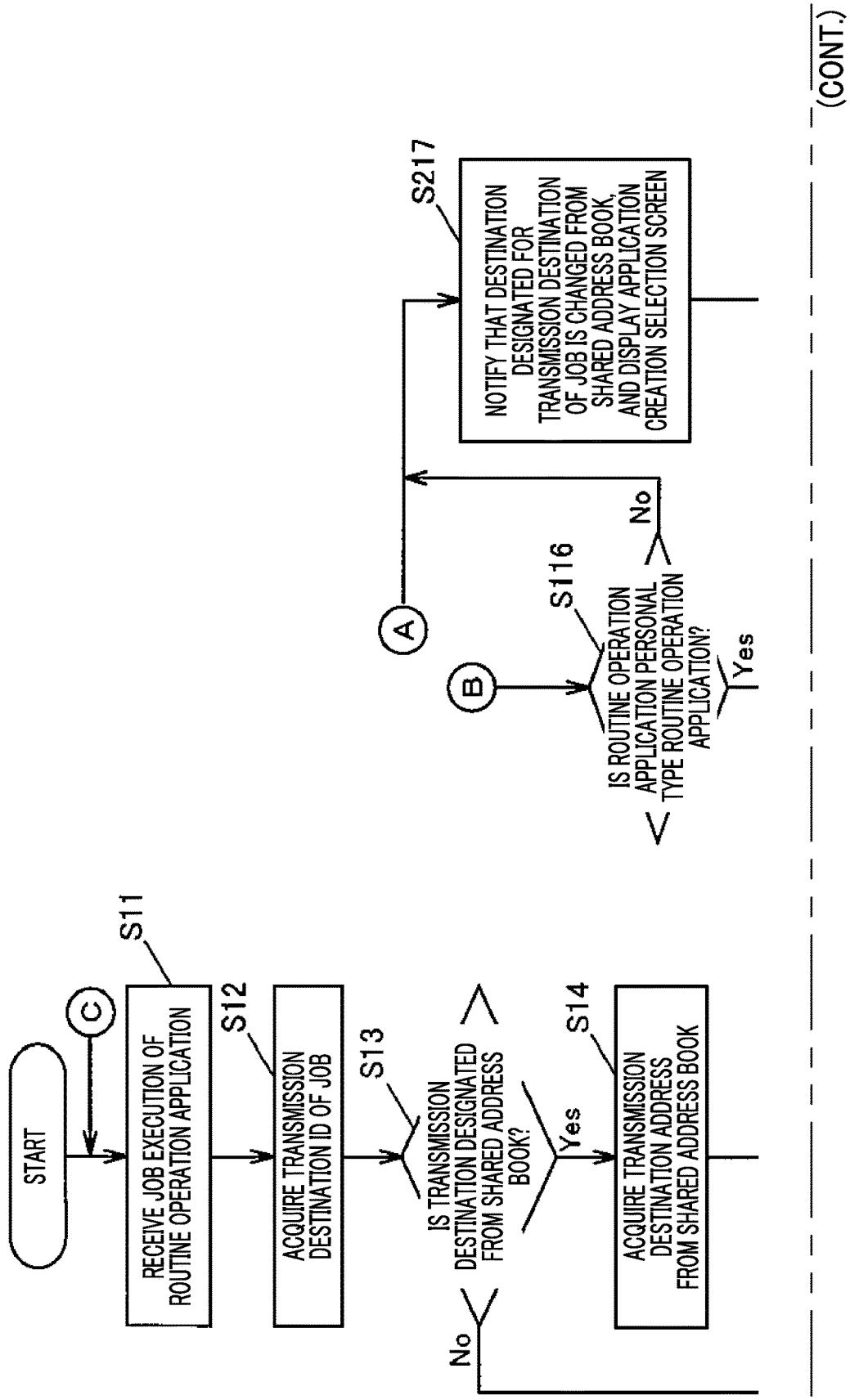
FIG. 11 is a flowchart illustrating an example of an operation of an image forming apparatus according to a third exemplary embodiment of the present disclosure.

FIG. 10 is a view illustrating an example of the application creation selection screen 120 displayed on the operation display 4 by the image forming apparatus 1. The application creation selection screen 120 includes: a message 120a that performs display indicating that the transmission destination address recorded in the shared address book database 33 is changed; an "execute job" button 121 for executing the routine operation application job with the transmission destination address recorded in the routine operation application table 31 as the transmission destination; an "execute application creation" button 122 for creating the new shared type application with the transmission destination address recorded in the shared address book database 33 as the transmission destination and executing the job; and a "cancel" button 123 for canceling the instruction to execute the routine operation application job.

When the "execute application creation" button 122 on the application creation selection screen 120 is operated (S218: Yes), the execution unit 21 creates a new shared type application with the transmission destination address recorded in the shared address book database 33 as the transmission destination (S219), and records user ID, transmission destination address, transmission destination ID, job parameters and the like in the routine operation application table 31, and the execution unit 21 executes the job of the newly created shared type application. (S21).

When the "execute job" button 121 on the application creation selection screen 120 is operated (S218: No), and the "cancel" button 123 is not operated (S20: Yes), the execution unit 21 executes the routine operation application job with the transmission destination address recorded in the shared address book database 33 as the transmission destination (S21).

When the "execute job" button 121 and the "execute application creation" button 122 on the application creation selection screen 120 displayed on the operation display 4 are not operated (S218: No), and the "cancel" button 123 is operated (S20: No), the execution unit 21 does not execute the routine operation application job.

Although the exemplary embodiments of the present disclosure have been described above, the exemplary embodiments of the present disclosure are not limited to the above-described exemplary embodiments, and various modifications and implementations are possible without departing from the scope of the present disclosure.

Each unit of the control section 10 may be partially or entirely configured by a hardware circuit, such as a reconfigurable circuit (FPGA: field programmable gate array) or an integrated circuit for a specific application (ASIC: application specific integrated circuit).

In addition, it is possible to omit or change some of the configuration elements of the above-described exemplary embodiments without departing from the scope of the present disclosure.

In addition, steps can be added, deleted, changed, replaced, and the like in the flow of the above-described exemplary embodiment without departing from the scope of the present disclosure. The program used in the above-described exemplary embodiment can be provided by being recorded on a computer-readable recording medium, such as a CD-ROM. The program used in the above-described exemplary embodiment can be stored in an external server, such as a cloud server and used via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a memory storing executable instructions; and
a processor programmed to execute the instructions to:
receive an instruction to execute an application for transmitting data to a preset transmission destination;
record information regarding a first person in an address book in association with the transmission destination, and record information regarding a second person in the address book in association with a different transmission destination when information regarding the transmission destination included in the address book has been changed;
in response to a change made by the second person to the information regarding the transmission destination:
determine whether or not the first person is the same as the second person by comparing the information regarding the first person input before the instruction of the execution with the information on the second person recorded in the address book;
upon determining that the first person differs from the second person, perform notification to the first person; and
upon determining that the first person is the same as the second person, refrain from performing the notification when the first person is the same as the second person, wherein
the first person is one who instructs execution of the application for transmitting data to the preset transmission destination,
the second person is one who has changed information regarding the transmission destination included in an address book, and
the notification indicates that the information regarding the transmission destination has been changed.

2. The information processing apparatus according to claim 1, wherein the processor is programmed to execute the instructions to:
perform the notification to the first person only one time when the first person differs from the second person and the application is a personal type that is usable only by persons registered for the application.

3. The information processing apparatus according to claim 2, wherein the processor is programmed to execute the instructions to:
change the information on the transmission destination preset for the application to the same as that in the address book after the notification is performed one time and execute the application.

4. The information processing apparatus according to claim 3, wherein the processor is programmed to execute the instructions to:
refrain from performing the notification a second time or more when the first person performs a predetermined operation.

5. The information processing apparatus according to claim 4, wherein the processor is programmed to execute the instructions to:
change the information on the transmission destination and execute the application when changing the information on the transmission destination and executing the application are selected as the predetermined operation on a selection screen.

6. The information processing apparatus according to claim 1, wherein the processor is programmed to execute the instructions to:
perform the notification to the first person only one time when the first person differs from the second person and the application is a type other than a personal type that is usable only by persons registered for the application.

7. The information processing apparatus according to claim 6, the processor is programmed to execute the instructions to:
create and execute a new application that deals with the changed information on the transmission destination after the notification is performed one time.

8. The information processing apparatus according to claim 6, wherein the processor is programmed to execute the instructions to:
refrain from performing notification second times or more when the first person performs a predetermined operation.

9. The information processing apparatus according to claim 7, wherein the processor is programmed to execute the instructions to:
  create and execute a new application in which the information on the transmission destination is changed when creating and executing the new application in which the information on the transmission destination is changed are selected as a predetermined operation on a selection screen.

10. A non-transitory computer readable medium storing a program causing a computer to execute an information processing process comprising:
  receiving an instruction to execute an application for transmitting data to a preset transmission destination;
  recording information regarding a first person in an address book in association with the transmission destination, and recording information regarding a second person in the address book in association with a different transmission destination when information regarding the transmission destination included in the address book has been changed, wherein
  in response to a change made by the second person to the information regarding the transmission destination, the information processing process further comprises:
    determining whether or not the first person is the same as the second person by comparing the information regarding the first person input before the instruction of the execution with the information on the second person recorded in the address book;
    upon determining that the first person differs from the second person, performing notification to a first person; and
    upon determining that the first person is the same as the second person, refraining from performing the notification when the first person is the same as the second person,
  the first person is one who instructs execution of an application for transmitting data to a preset transmission destination,
  the second person is one who has changed information on the transmission destination included in an address book, and
  the notification indicates that the information on the transmission destination has been changed.

* * * * *